United States Patent
Hardt et al.

(10) Patent No.: US 10,484,942 B2
(45) Date of Patent: Nov. 19, 2019

(54) WIRELESS ACCESS POINT MANAGING APPARATUS

(71) Applicant: ARRIS Enterprises LLC, Suwanee, GA (US)

(72) Inventors: Charles Hardt, Lawrenceville, GA (US); Dmitry Barablin, Lawrenceville, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/134,507

(22) Filed: Apr. 21, 2016

(65) Prior Publication Data

US 2017/0311271 A1 Oct. 26, 2017

(51) Int. Cl.
*H04W 4/00* (2018.01)
*H04W 52/02* (2009.01)
*H04W 84/12* (2009.01)
*H04W 88/12* (2009.01)

(52) U.S. Cl.
CPC .... *H04W 52/0206* (2013.01); *H04W 52/0212* (2013.01); *H04W 84/12* (2013.01); *H04W 88/12* (2013.01); *Y02D 70/142* (2018.01); *Y02D 70/144* (2018.01)

(58) Field of Classification Search
CPC ............. H04W 52/287; H04W 52/228; H04W 72/0453; H04W 52/0206; H04W 72/0473; H04W 88/12; H04W 84/12
See application file for complete search history.

(56) References Cited

U.S. PATENT DOCUMENTS

| 8,855,087 | B2 | 10/2014 | Banerjee et al. | |
|---|---|---|---|---|
| 2010/0067421 | A1* | 3/2010 | Gorokhov | H04W 52/0206 370/311 |
| 2013/0028157 | A1* | 1/2013 | Ruster | H04W 52/0206 370/311 |
| 2013/0097446 | A1* | 4/2013 | Bernard | H04L 12/2834 713/323 |
| 2015/0124790 | A1* | 5/2015 | Seine | H04W 76/00 370/338 |
| 2015/0351027 | A1* | 12/2015 | Kotecha | H04W 52/0206 370/311 |
| 2016/0057699 | A1* | 2/2016 | Jang | H04L 5/0055 370/311 |

(Continued)

*Primary Examiner* — Clemence S Han
(74) *Attorney, Agent, or Firm* — Stewart M. Wiener

(57) ABSTRACT

A wireless access point managing apparatus that includes a radio, and wireless communication control circuitry that communicates information via the radio between the wireless access point managing apparatus and one or more electronic devices so as to provide a wireless access point to a network for the electronic devices. Processing circuitry performs access point management including: communicating with a separate apparatus that provides another wireless access point to the network; performing a determination as to whether shutdown of the wireless access point of the separate apparatus is appropriate; and sending a shutdown instruction to the separate apparatus if shutdown is determined to be appropriate, the shutdown instruction being an instruction to cause the separate apparatus to shut down a wireless access point radio in the separate apparatus.

18 Claims, 3 Drawing Sheets

(56) References Cited

U.S. PATENT DOCUMENTS

| | | | |
|---|---|---|---|
| 2016/0113055 A1* | 4/2016 | Fan | H04W 8/005 370/329 |
| 2016/0212695 A1* | 7/2016 | Lynch | H04W 48/08 |
| 2016/0295521 A1* | 10/2016 | Grayson | H04W 4/02 |
| 2017/0041869 A1* | 2/2017 | Homchaudhuri | H04W 52/0206 |
| 2017/0142728 A1* | 5/2017 | Tsai | H04W 72/0453 |
| 2017/0171809 A1* | 6/2017 | Crowe | H04W 48/16 |
| 2017/0214567 A1* | 7/2017 | Salkintzis | H04L 41/0677 |

\* cited by examiner

WIRELESS ACCESS POINT MANAGING APPARATUS

BACKGROUND

In many housing situations, user electronic devices, such as mobile phones, electronic tablets, and computers, can normally detect multiple Wi-Fi Access Points (APs). The number of detectable APs can significantly increase in a Multi Dwelling Unit (MDU). In high density Multi Dwelling Units (MDUs), Wi-Fi Access Points (AP) located in each residence can create congestion between one another. Since there are a limited number of Wi-Fi channels available, it is not possible for each residence to use a unique Wi-Fi channel, thus it is often the case that multiple APs have to share a Wi-Fi channel. When two or more residences in the MDU use the same channel, bandwidth congestion occurs. Even when data traffic is low, mandatory Wi-Fi management messages (e.g., beacons, etc.) generate traffic and consume bandwidth.

With the proliferation of Wi-Fi client devices, many homes now have multiple APs available for use by electronic devices, such that the devices have access to a high quality signal anywhere within the home. In a home with multiple APs, the situation can arise in which an access point is not in use, i.e., it has no clients currently connected, but it continues to consume bandwidth due to various management messages.

Various types of network traffic, can generate slightly different types of Wi-Fi management messages, and these messages can consume anywhere from 10% to 15% of the network bandwidth. Even in the case where there are no clients attached to a given AP, management messages, such as beacons, can easily consume 5% of the network bandwidth.

In a high density MDU situation, one AP could potentially see 5 to 10 other APs. If each AP is consuming a minimum of 5% of the bandwidth, 10 APs could potentially consume 50% of the bandwidth, even if no clients were attached.

Furthermore, there is an unnecessary level of power (Watts) consumed by APs that are operating, but do not have any associated (connected) clients. This wasted power consumption can be several Watts per AP providing apparatus.

In most homes, there are times of the day when there is no active data streaming between user devices and any access point, e.g., while the kids are at school, or during the middle of the night. For homes having plural access points, a system that determines the number of access points needed based on demand, and turns off unneeded access points, would serve to conserve both bandwidth and power.

SUMMARY

When a secondary Access Point (AP) in the home determines that it has no active connected clients, it informs the primary AP. For example, circuitry, such as a hardware processor, in the secondary AP could determine that no client device has connected to the secondary AP for a certain length of time, and inform the primary AP of this lack of connection with a client device. The length of time can be configurable.

The primary AP in turn instructs the secondary AP to shutdown its radio, i.e., to power off the radio. The net affect of this is two fold. First, Wi-Fi channel consumption is reduced because no management messages are exchanged, and second, power is saved, because the Wi-Fi radio is shutdown, which saves approximately two Watts. Further, many APs have dual band radios and it possible that one or both of the radios could be shutdown.

Circuitry, such as a hardware processor, in the primary AP could also make an additional determination after receiving the indication of a lack of connection from the secondary AP before instructing the secondary AP to power down its radio. For example the primary AP could refer to a data base of historical use times in determining if powering down the secondary AP at a particular time of day is appropriate or not.

When the user returns to the home, the client device connects with the primary AP, which in turn may reactivate any secondary APs in the home. Once reactivated, the primary AP, may steer the client to one of the secondary APs.

The primary AP can also maintain a database regarding when and if the radio has been shut off during the course of the day/week. For example, using this information, the primary AP could determine that historically, there are no users between 01:00 AM and 08:00 AM. Thus the primary AP shuts down any secondary APs if there are no clients after 01:00 AM, but then automatically switches on the secondary APs at 08:00 AM (even before the primary AP detects a Wi-Fi client). This would be in advance of any new or renewed client detection by the primary AP.

In order to manage multiple access points, the present application discloses a wireless access point managing apparatus that includes a radio, wireless communication control circuitry that communicates information via the radio between the wireless access point managing apparatus and one or more electronic devices so as to provide a wireless access point to a network for the electronic devices. The wireless access point managing apparatus also includes a hardware processor and memory having stored therein a program that causes the processor to perform access point management including: communicating with a separate apparatus that provides another wireless access point to the network; performing a determination as to whether shutdown of the wireless access point of the separate apparatus is appropriate; and sending a shutdown instruction to the separate apparatus if shutdown is determined to be appropriate, the shutdown instruction being an instruction to cause the separate apparatus to shut down a wireless access point radio in the separate apparatus.

The program in the memory can also cause the hardware processor to: determine whether an inactivity signal is received from the separate apparatus, the inactivity signal being an indication that the separate apparatus has no active connection by a client device on the wireless access point provided by the separate apparatus; perform the determination as to whether shutdown of the wireless access point of the separate apparatus is appropriate in response to receiving the inactivity signal; and send a shutdown instruction to the separate apparatus if shutdown is determined to be appropriate. Further, the program in the memory can cause the hardware processor to determine that shutdown is appropriate due to receiving of the inactivity signal.

The memory could have stored therein a database of power-up times that have occurred over a period of time, wherein in performing the determination as to whether shutdown of the wireless access point of the separate apparatus is appropriate in response to receiving the inactivity signal, the hardware processor references the database and determines that shutdown is appropriate based on a time of receiving the inactivity signal compared to the power-up times in the database.

Likewise, the memory can have stored therein a database of shutdown times that have occurred over a period of time, wherein in performing the determination as to whether shutdown of the wireless access point of the separate apparatus is appropriate, the hardware processor references the database and determines that shutdown is appropriate based on the current time and the shutdown times in the database.

The program in the memory can cause the hardware processor to perform a determination as to whether the wireless access point of the separate apparatus is to be turned on, and send a power up instruction to the separate apparatus to power up a wireless access point radio in the separate apparatus if the result of the determination as to whether the wireless access point of the separate apparatus is to be turned on is positive. The determination as to whether the wireless access point of the separate apparatus is to be turned on can include detecting whether the wireless communication control circuitry has entered into communication with an electronic device via the radio, and sending the instruction to the separate apparatus to power up a wireless access point radio in the separate apparatus if it is detected that the wireless communication control circuitry has entered into communication with an electronic device via the radio.

A wired connection could be provided to connect to the separate apparatus, wherein the hardware processor sends the power up instruction to the separate apparatus via the wired connection.

The separate apparatus can includes plural radios, in which case the power up instruction is an instruction to cause the separate apparatus to power up at least one of its radios, and the hardware processor sends the power up instruction to the separate apparatus via the radio of the wireless access point managing apparatus. The hardware processor can also send the shutdown instruction to the separate apparatus via the wired connection. Alternatively, the hardware processor can send the shutdown instruction to the separate apparatus via the radio.

DETAILED DESCRIPTION

Exemplary embodiments will be described in detail below with reference to the drawings. The description and drawings are provided so that a person skilled in the art can fully understand the present disclosure and are not intended to limit the subject matter recited in the claims.

Figure 5:
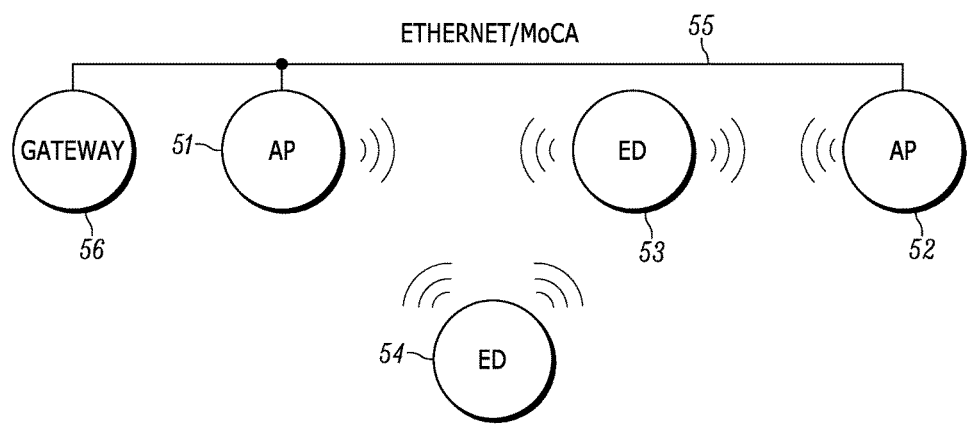
FIG. 5 is an example of a network system in a home or other building having multiple access points serving multiple stations.

As shown for example in FIG. 5, many homes or other facilities today have more than one access point (AP) 51, 52, and potentially have multiple wireless electronic devices 53, 54, . . . , etc. Wi-Fi radios in these APs can consume anywhere from 2 to 3 Watts of power, even if the radio is in a receive-only mode. It is advantageous from a power conservation perspective to shut off any Wi-Fi radio that is not in use, or that is potentially under-utilized.

The multiple APs are linked together via a wired connection 55 such as Ethernet or MoCA. This connection can alternatively be a wireless connection such as Wi-Fi or Bluetooth. The multiple APs 51 and 52 can exchange data or video streams using the wired connection 55, as a back haul mechanism. A gateway device 56 could then potentially use any AP in the home, e.g., AP 51 or AP 52, to provide a Wi-Fi connection to an electronic device 53, 54.

Figure 1:
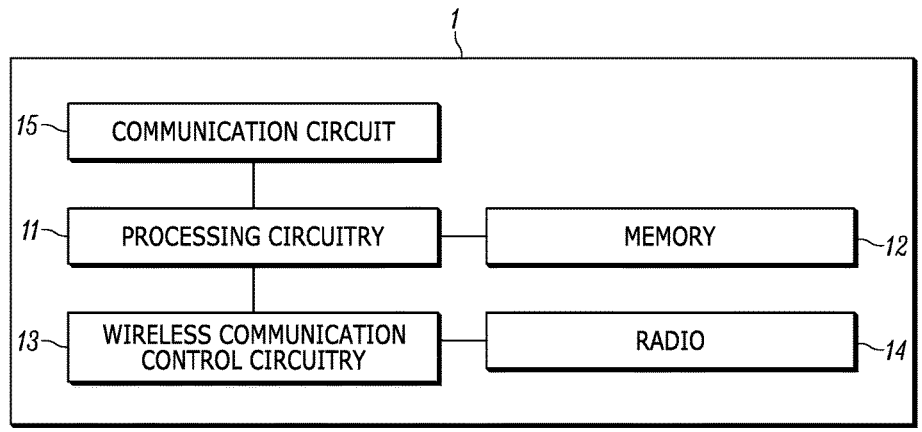
FIG. 1 is a block diagram of an embodiment of a wireless access point managing apparatus.

FIG. 1 is a block diagram of a wireless access point managing apparatus 1. Wireless communication control circuitry 13 communicates information via a radio 14 between the wireless access point managing apparatus 1 and one or more electronic devices so as to provide a wireless access point to a network for the electronic devices, e.g., providing wireless access point 51 in FIG. 5. The wireless communication control circuitry 13 implements a wireless communication protocol such as Wi-Fi to provide a Wi-Fi access point for electronic devices 53, 54 to a network. The electronic device can be any device that can communicate via Wi-Fi, such as a music player, a mobile phone, a tablet device, a notebook device, a laptop computer, a desktop computer, or a gaming system.

The wireless access point managing apparatus 1 includes processing circuitry 11, such as a hardware processor. Alternatively, the processing circuitry can be one or more integrated circuits. Specific examples of technologies for implementing the processing circuitry are discussed below. A memory 12, such as a ROM or RAM, has stored therein a program that causes the processing circuitry to perform access point management.

The access point management performed by the processing circuitry 11 includes communicating, via the communication circuit 15, with a separate apparatus that provides another wireless access point to the network, such as the access point 52, performing a determination as to whether shutdown of the wireless access point of the separate apparatus 52 is appropriate, and sending a shutdown instruction to the separate apparatus 52 if shutdown is determined to be appropriate. The shutdown instruction is an instruction to cause the separate apparatus 52 to shut down a wireless access point radio in the separate apparatus.

Figure 6:
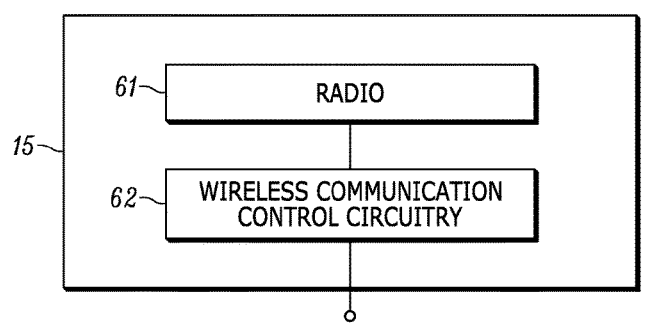
FIG. 6 is a block diagram of an embodiment of the communication circuit.

The communication circuit can be a wired connection for effecting communication according to an Ethernet or MoCa protocol over the connection 15. Alternatively, as shown in FIG. 6, the communication circuit can include a further radio 61, and further wireless communication control circuitry 62, and wirelessly communicate information between the wireless access point managing apparatus 1 and the separate access point apparatus 52. The further wireless communication control circuitry 62 can be configured to communicate according to a Bluetooth protocol, whereas the wireless communication control circuitry 13 is configured to communicate according to a Wi-Fi protocol.

Figure 2:
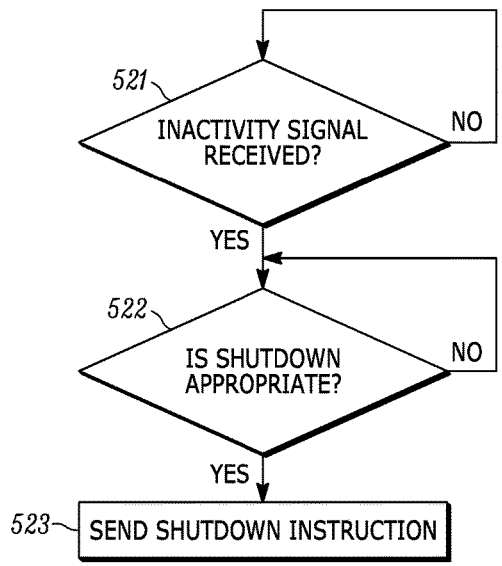
FIG. 2 is a flow chart of an example of the access point management process.

FIG. 2 is a flowchart of an example of the access point management process. The separate apparatus sends an inactivity signal when the separate apparatus (which provides another access point) determines that there is no active connection by an electronic device to the access point provided by the separate apparatus. The inactivity signal is sent either via radio (e.g., Wi-Fi, or Bluetooth) or via a wired connection (e.g., Ethernet or MoCA). In step S21, the processing circuitry 11 of the wireless access point managing apparatus 1 determines whether an inactivity signal has been received from the separate apparatus. If no inactivity signal has been received the processing circuitry 11 continues to monitor for receipt of an inactivity signal.

When the processing circuitry 11 determines in step S21 that an inactivity signal has been received, the processing circuitry 11 determines whether or not shutdown of the radio of the separate apparatus is appropriate in step S22. If the processing circuitry 11 determines in step S22 that shutdown of the radio of the separate apparatus is appropriate, the processing circuitry 11 sends a shutdown instruction to the separate apparatus in step S23.

The processing circuitry 11 can be configured to determine that shutdown is appropriate due to the mere fact of receiving of the inactivity signal. Alternatively, other criteria can be checked by the processing circuitry 11 after receiving the inactivity signal before determining that shutdown of the wireless access point of the separate apparatus is appropriate. For example, a database of power-up times that have occurred over a period of time can be stored in the memory 12, and in performing the determination as to whether shutdown of the wireless access point of the separate apparatus is appropriate in response to receiving the inactivity signal, the processing circuitry references the database and determines that shutdown is appropriate based on a time of receiving the inactivity signal compared to the power-up times in the database. More specifically, if the data in the database indicates that the current time is during a time period of historically heavy usage, or that a period of heavy usage is to occur shortly, then the processing circuitry 11 could determine that shutdown of the wireless access point of the separate apparatus is not appropriate even though the inactivity signal has been received.

The management process implemented by the processing circuitry 11 can also be configured to independently determine that shutdown of the wireless access point of the separate apparatus is appropriate even when no inactivity signal is received. For example, a database of shutdown times that have occurred over a period of time can be stored in the memory 12, and in performing the determination as to whether shutdown of the wireless access point of the separate apparatus is appropriate, the processing circuitry references the database and determines that shutdown is appropriate based on the current time and the shutdown times in the database.

Figure 3:
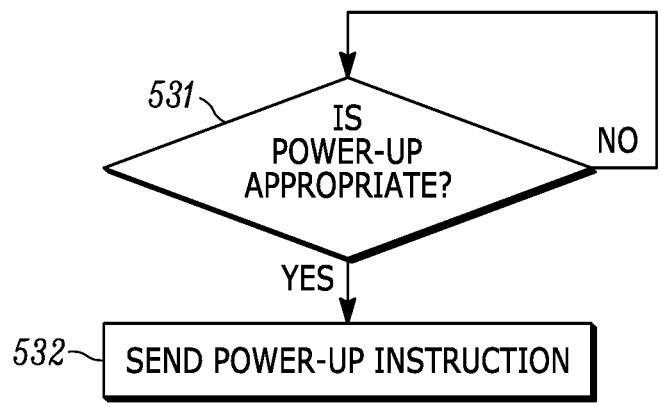
FIG. 3 is a flow chart of the power up determination process.

As shown in the flow chart of FIG. 3, after the wireless access point of the separate apparatus has been shut down, the processing circuitry 11 of the wireless access point managing apparatus performs a determination as to whether the wireless access point of the separate apparatus is to be turned on in step S31. In step S32, the processing circuitry 11 sends a power up instruction to the separate apparatus to power up a wireless access point radio in the separate apparatus if the result of the determination as to whether the wireless access point of the separate apparatus is to be turned on is positive. In an example of the determination process for powering up the wireless access point of the separate apparatus, the processing circuitry refers to a database of power-up times that have occurred over a period of time, and determines that powering up the wireless access point of the separate apparatus is appropriate based on the current time compared to the power-up times in the database, regardless of whether or not an electronic device is newly connected to the network via the wireless communication control circuitry 13 and radio 14.

Figure 4:
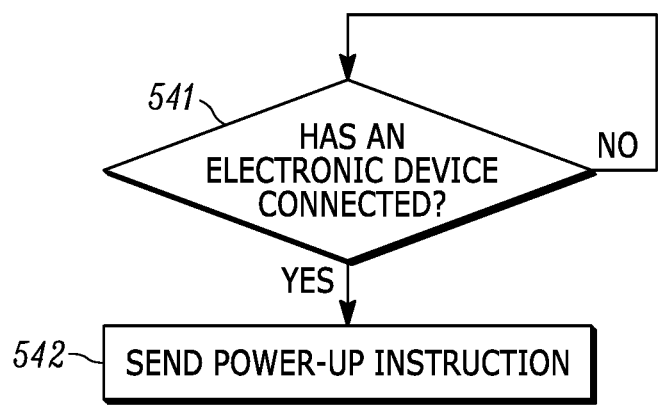
FIG. 4 is a flow chart of another example of a power up determination process.

Another example of the determination process is shown in the flow chart of FIG. 4. Since the access point provided by the separate apparatus has been powered down, if an electronic device is to wirelessly access the network, such wireless access will occur through the wireless communication control circuitry 13 and radio 14 of the wireless access management apparatus 1. In step S41, the processing circuitry 11 therefore detects whether the wireless communication control circuitry 13 has entered into communication with an electronic device via the radio 14, and if so, in step S42, the processing circuitry send the instruction to the separate apparatus to power up a wireless access point radio in the separate apparatus. The shut-down instruction can be sent to the separate apparatus via the wireless communication circuitry 13 and radio 14.

The wireless access point managing apparatus 1 can be connected to the separate apparatus via a wired connection, such as an Ethernet controller and Ethernet PHY (physical transceiver), and/or a MoCA controller and MoCA PHY (physical transceiver). In such a configuration, the shut-down instruction can be sent to the separate apparatus via the wired connection. If the separate apparatus includes only one radio, during the power down state of the separate apparatus, the power up instruction cannot be sent via radio since the radio in the separate apparatus is powered off. Therefore, in such a configuration, the processing circuitry 11 sends the power up instruction to the separate apparatus via the wired connection.

Alternatively, the separate apparatus can include plural radios. In such a configuration, the power up instruction is an instruction to cause the separate apparatus to power up at least one of its radios, e.g., the radio that had been powered down, and the processing circuitry 11 of the wireless access point managing apparatus 1 sends the power up instruction to the separate apparatus via the radio 14 of the wireless access point managing apparatus 1. Further, one of the radios of the separate apparatus could implement a different radio communication protocol, such as Bluetooth, and the wireless access point managing apparatus 1 can include a corresponding radio, i.e., a Bluetooth radio, to communicate the power up instruction to the separate apparatus.

The present invention can be implemented not only as an apparatus or apparatuses, but also as a method including the steps as discussed above and illustrated in FIGS. 2-4, which methods as discussed above constitute examples of algorithms. The invention can also be implemented as a program on a non-transitory computer-readable medium for causing a computer to execute such steps. The non-transitory computer-readable recording medium could be, for example, a CD-ROM, DVD, Blu-ray disc, or an electronic memory device.

The present invention may be implemented as any combination of a system, a method, an integrated circuit, and a computer program on a non-transitory computer readable recording medium.

The wireless access point managing apparatus 1 may be in the form of a set-top box or other standalone device, or may be incorporated in a television or other content playing apparatus, or other device and the scope of the present invention is not intended to be limited to such forms.

The blocks illustrated in FIG. 1 may be formed in individual chips, or any or all of these blocks may be included and formed in one chip. The technology of implementation of the circuitry can be Large Scale Integration (LSI), but may also be referred to as an IC, a system LSI, a super LSI, or an ultra LSI in accordance with the different degrees of integration. These technologies allow for the circuitry of the present invention to be integrated as a computer system configured by including a microprocessor, a ROM, a RAM, and the like, wherein a computer program is stored in the ROM and the microprocessor implements the stored program to achieve the function of the program.

A method for implementing the integrated circuit is not limited to LSI. The integrated circuit may also be implemented by a dedicated circuit or a versatile processor.

If a new technique for integrated circuit production arises, such new technique may be used to implement the blocks shown in FIG. 1.

Components of the wireless access point managing apparatus may also be implemented as a specifically programmed general purpose processor, CPU, a specialized microprocessor such as Digital Signal Processor that can be directed by program instructions, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

The present invention may be a non-transitory computer-readable recording medium having recorded thereon a program embodying the methods/algorithms discussed above for instructing a processor to perform the methods/algorithms.

Each of the elements of the present invention may be configured by implementing dedicated hardware or a software program controlling a processor to perform the functions of any of the components or combinations thereof. Any of the components may be implemented as a CPU or other processor reading and executing a software program from a recording medium such as a hard disk or a semiconductor memory.

The sequence of the steps included in the above described algorithms illustrated in FIGS. 2-4 is illustrative, and algorithms having a sequence other than the above described sequences are contemplated. Moreover, steps, or parts of the algorithm, may be implemented simultaneously or in parallel where appropriate.

It is also contemplated that the implementation of the components of the present invention can be done with any newly arising technology that may replace any of the above implementation technologies.

We claim:

1. A wireless access point managing apparatus comprising:
   a radio;
   wireless communication control circuitry that communicates information via the radio between the wireless access point managing apparatus and one or more electronic devices so as to provide a first wireless access point to a network for a client electronic device, wherein the client electronic device is included in the one or more electronic devices;
   a hardware processor; and
   a memory having stored therein a program that causes the hardware processor to perform access point management including:
      communicating with a separate apparatus that provides a second wireless access point to the network, wherein the separate apparatus includes a plurality of radios, the plurality of radios for connecting wirelessly via different radio communication protocols;
      performing a determination as to whether shutdown of the second wireless access point is appropriate;
      sending a shutdown instruction to the separate apparatus if shutdown is determined to be appropriate, the shutdown instruction being an instruction to cause the separate apparatus to shut down the second wireless access point by powering down at least one radio of the plurality of radios in the separate apparatus;
      performing a determination as to whether the second wireless access point in the separate apparatus is to be turned on;
      sending a power up instruction to the separate apparatus to reactivate the second wireless access point by powering up the at least one radio of the second wireless access point in the separate apparatus, if the result of the determination as to whether the second wireless access point is to be turned on is positive; and
      after the second wireless access point is reactivated;
      in the first wireless access point, if the client electronic device is in communication with the first wireless access point, steering the client electronic device to the second wireless access point.

2. The wireless access point managing apparatus according to claim 1, wherein the program in the memory further causes the hardware processor to:
   determine whether an inactivity signal is received from the separate apparatus, the inactivity signal being an indication that the separate apparatus has no active connection by a client device on the second wireless access point provided by the separate apparatus;
   perform the determination as to whether shutdown of the second wireless access point is appropriate in response to receiving the inactivity signal; and
   send a shutdown instruction to the separate apparatus if shutdown is determined to be appropriate.

3. The wireless access point managing apparatus according to claim 2, wherein the program in the memory further causes the hardware processor to determine that shutdown is appropriate due to receiving of the inactivity signal.

4. The wireless access point managing apparatus according to claim 2, wherein:
   the memory has stored therein a database of power-up times that have occurred over a period of time; and
   in performing the determination as to whether shutdown of the second wireless access point is appropriate in response to receiving the inactivity signal, the hardware processor references the database and determines that shutdown is appropriate based on a time of receiving the inactivity signal compared to the power-up times in the database.

5. The wireless access point managing apparatus according to claim 1, wherein:
   the memory has stored therein a database of shutdown times that have occurred over a period of time; and
   in performing the determination as to whether shutdown of the second wireless access point is appropriate, the hardware processor references the database and determines that shutdown is appropriate based on a current time and the shutdown times in the database.

6. The wireless access point managing apparatus according to claim 1, wherein the determination as to whether the second wireless access point is to be turned on comprises:
   detecting whether the wireless communication control circuitry has entered into communication with the client electronic device via the radio.

7. The wireless access point managing apparatus according to claim 1, further comprising a wired connection to be connected to the separate apparatus, wherein the hardware processor sends the power up instruction to the separate apparatus via the wired connection.

8. The wireless access point managing apparatus according to claim 1, wherein:
the separate apparatus includes plural radios;
the power up instruction is an instruction to cause the separate apparatus to power up at least one of its radios; and
the hardware processor sends the power up instruction to the separate apparatus via the radio of the wireless access point managing apparatus.

9. The wireless access point managing apparatus according to claim 1, further comprising a wired connection to be connected to the separate apparatus, wherein the hardware processor sends the shut-down instruction to the separate apparatus via the wired connection.

10. The wireless access point managing apparatus according to claim 1, wherein the hardware processor sends the shut-down instruction to the separate apparatus via the radio.

11. The wireless access point managing apparatus according to claim 1, wherein:
the shutdown instruction is an instruction to cause the separate apparatus to shut down at least one of its radios.

12. A wireless access point managing method comprising:
communicating information via wireless communication control circuitry and a radio with one or more electronic devices so as to provide a first wireless access point to a network for a client electronic device, wherein the client electronic device is included in the one or more electronic devices;
communicating with a separate apparatus that provides a second wireless access point to the network, wherein the separate apparatus includes a plurality of radios, the plurality of radios for connecting wirelessly via different radio communication protocols;
performing a determination, with a processor, as to whether shutdown of the second wireless access point is appropriate;
sending a shutdown instruction to the separate apparatus if shutdown is determined to be appropriate, the shut-down instruction being an instruction to cause the separate apparatus to shut down the second wireless access point by powering down at least one radio of the plurality of radios in the separate apparatus;
performing a determination as to whether the second wireless access point in the separate apparatus is to be turned on;
sending a power up instruction to the separate apparatus to reactivate the second wireless access point by powering up the at least one radio of the second wireless access point in the separate apparatus, if the result of the determination as to whether the second wireless access point is to be turned on is positive; and
after the second wireless access point is reactivated:
in the first wireless access point, if the client electronic device is in communication with the first wireless access point, steering the client electronic device to the second wireless access point.

13. The wireless access point managing method according to claim 12, further comprising:
determining whether an inactivity signal is received from the separate apparatus, the inactivity signal being an indication that the separate apparatus has no active connection by a client device on the second wireless access point provided by the separate apparatus;
performing the determination as to whether shutdown of the second wireless access point is appropriate in response to receiving the inactivity signal; and
sending a shutdown instruction to the separate apparatus if shutdown is determined to be appropriate.

14. The wireless access point managing method according to claim 13, comprising determining that shutdown is appropriate due to receiving of the inactivity signal.

15. The wireless access point managing method according to claim 13, comprising:
storing, in a memory, a database of power-up times that have occurred over a period of time; and
in performing the determination as to whether shutdown of the second wireless access point is appropriate in response to receiving the inactivity signal, referencing the database and determining that shutdown is appropriate based on a time of receiving the inactivity signal compared to the power-up times in the database.

16. The wireless access point managing method according to claim 12, comprising:
storing, in a memory, a database of shutdown times that have occurred over a period of time; and
in performing the determination as to whether shutdown of the second wireless access point is appropriate, referencing the database and determining that shutdown is appropriate based on a current time and the shutdown times in the database.

17. The wireless access point managing method according to claim 12, wherein the determination as to whether the second wireless access point is to be turned on comprises:
detecting whether the wireless communication control circuitry has entered into communication with the client electronic device via the radio.

18. The wireless access point managing method according to claim 12, comprising sending the power up instruction to the separate apparatus via a wired connection.

* * * * *